Sept. 10, 1968  F. R. WOOD  3,401,073
PAINT ROLLER COVERING APPLYING MACHINE
Filed Feb. 1, 1965
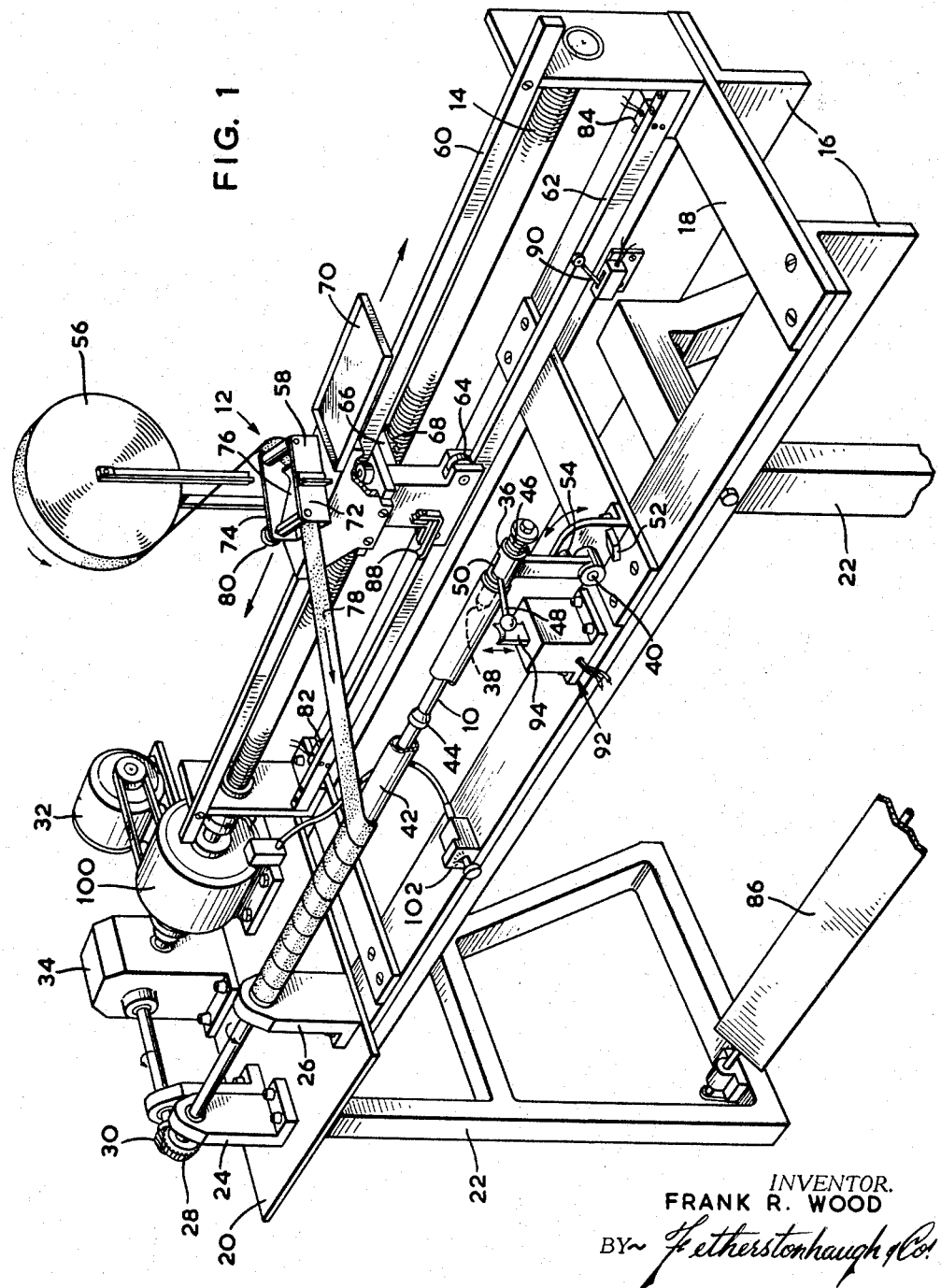
INVENTOR.
FRANK R. WOOD
BY Fetherstonhaugh & Co.
ATTORNEYS

3,401,073
PAINT ROLLER COVERING APPLYING MACHINE

Frank R. Wood, Lancaster, New Brunswick, Canada, assignor to T. S. Simms & Co. Limited, St. John, New Brunswick, Canada
Filed Feb. 1, 1965, Ser. No. 429,327
2 Claims. (Cl. 156—353)

ABSTRACT OF THE DISCLOSURE

This invention provides an apparatus for wrapping strip fabric onto long lengths of core material to form roller coaters. The apparatus is characterized by a mandrel by which the long lengths of core material are rotated and a traversing feeding mechanism for the strip fabric. The traversing mechanism moves under the influence of a feed screw positioned parallel to the mandrel. Means is provided for varying the relative speeds of the mandrel and the feed screw which can be operated by an operator positioned at the mandrel so that the movement of the strip fabric feeding device can be speeded up or slowed down to accommodate variations in the width of the fabric being wound on the core. The apparatus also includes means for automatically cutting off the wound strip fabric at the end of each winding operation.

---

This invention relates to the manufacture of paint roller covers and is particularly concerned with an apparatus for winding strip fabric on long roller cover core material which is subsequently cut to size.

The term "paint roller" is now well known as these devices have been widely accepted for certain painting operations. A roller coater cover is a short tube coated with a suitable paint accepting pile fabric. As commonly constructed, they consist of an inner tubular core of heavy paperboard or fibreboard with the outer fabric normally being applied to the core by spirally wrapping a strip about the core using an adhesive to fix it in place. In manufacturing such roller coater covers, it has been common to wrap the strip material about a long section of core and to subsequently cut the long section into a plurality of covers.

There have been several prior proposals of apparati particularly designed for carrying out the above mentioned strip wrapping process about a long section of core. Included in the prior designs has been one which simply consists of a rotatable mandrel on which the core is mounted, with the strip being fed onto the core by hand as the mandrel is rotated. While this apparatus produces satisfactory roller covers, its operation is time consuming and involves relatively high labour costs.

Another proposed design essentially consists of a stationary strip winding device with a continuous core being moved longitudinally thereof. This particular design is quite complicated and is both expensive to manufacture and operate.

One of the chief difficulties in producing roller covers by winding strip material on the long cover core is that one cannot rely on a supply of strip material which is consistently of the same width. Even variations of a sixteenth of an inch in the width of the strip material will cause gaps or overlapping in the fabric as applied to the core. The strip material is usually supplied in long lengths and while there can be small variations even in any one length, there is more frequently variations in the width as between various lengths.

It is, therefore, an object of this invention to provide a paint roller cover manufacturing apparatus which will accommodate variations in the width of strip fabric supplied.

It is a more specific object of the invention to provide a roller cover manufacturing apparatus which essentially consists of a frame, a rotatable mandrel mounted on said frame and adapted to receive and to rotate a long length of core material, a rotatable feed screw mounted on said frame with its longitudinal axis extending substantially parallel to the longitudinal axis of said mandrel, a strip fabric feeding device supported by said frame adjacent said feed screw and adapted to move back and forth in a direction substantially parallel with the longitudinal axes of said feed screw and said mandrel, gear means operatively interconnecting said fabric feeding device and said feed screw whereby the rotation of said feed screw causes the movement of said feeding device, and means for rotating said feed screw and said mandrel, said rotating means including means for varying the relative speeds of rotation of said feed screw and said mandrel.

The above and further objects of the invention will be more thoroughly understood from the following description of a preferred embodiment thereof as read in conjunction with the accompanying drawing.

In the drawing:

FIG. 1 is a perspective view of this preferred embodiment of the apparatus according to the invention for wrapping fabric strip on roller coater cores.

The illustrated apparatus essentially consists of a rotatable mandrel 10, a fabric feeding device 12, and a rotatable feed screw 14 for moving the device 12 back and forth parallel to mandrel 10. The apparatus includes an appropriate supporting frame having a pair of longitudinally extending girders 16 supporting a plurality of transverse members 18 and a power unit platform 20 with the girders in turn being supported by a pair of legs 22. It will be appreciated that variations in the construction of the frame can be made without departing from the scope of the invention.

The mandrel 10 is a tube or a solid rod which is supported at its left-hand end in suitable bearings carried by a pair of upstanding brackets 24 and 26. Attached to the portion of mandrel 10 which projects beyond the bearing carried by bracket 24, there is a bevel gear 28 which is meshed with a second gear 30 whereby the mandrel may be rotated by motor 32 through speed reducer 34. The right-hand end of mandrel 10 is adapted to receive a pivotal holder 36. Where the mandrel is made of tubular material, the forward tip 38 of holder 36 is merely received in the end of the tube. Where a solid rod is used, it is provided with an appropriate recess for receiving tip 38. The holder 36 can be downwardly pivoted about axle 40 as to leave the right-hand end of the mandrel unobstructed for the reception of a length of core 42. Accordingly, when holder 36 has been lowered, the mandrel is supported only by the bearing brackets as its left-hand end and as it tends to sag at its right-hand end, tip 38 is bevelled at its forwardmost end so that when the holder is moved upwardly, the tip 38 will engage the mandrel.

To accommodate core material 42 of different sizes, mandrel 10 is provided with a plurality of replaceable collars 44 which are held tightly on the mandrel by set screws. The collars are bevelled on their right-hand sides as to avoid difficulty in sliding the cores 42 on the mandrel. The collars are sized so that the cores will be snugly received. This ensures rotation of the cores with the mandrel. To further guarantee rotation of the cores, the leftwardmost collar immediately adjacent bearing bracket 26 is provided with a small upstanding knife edge extending parallel with the axis of the mandrel so that when the cores are rammed tightly against the final collar, the knife edge will engage the inside surface of the cores.

In order that pivotal holder 36 may be lowered, it is necessary that tip 38 first be withdrawn from the outer end of the mandrel at least until the start of its bevelled portion reaches the extreme outer end of the mandrel. To effect this withdrawal of tip 38, it is slidingly mounted within holder 36 against the bias of a spring 46 and is provided with a handle 48 extending outwardly from the tip through a curved slot 50. Thus, in dropping holder 36 the operator grasps handle 48 and moves it first upwardly and then away from the mandrel as to withdraw tip 38 from the mandrel with the handle then being used to lower holder 36. In actual operation, it has been found that the dropping of holder 36 can be effected by one continuous smooth movement on the part of the operator. In its lowered position, holder 36 is supported on an appropriate bracket 52 and as a further preferred expedient, it is held in its upper position by means of a spring bias ball device 54, the construction and arrangement of which will be understood by those skilled in the art. In raising holder 36 following the sliding of a core on the mandrel, the operator simply grasps handle 48 and pivots the holder upwardly relying on the bevel on the forward end of tip 38 to engage the end of the mandrel.

The fabric feeding device 12 essentially consists of a carriage for a large roll of strip fabric 56 and a tension applying device 58. The carriage is supported on a pair of longitudinally extending rails 60 and 62, with the lower end of the carriage carrying a pair of rotatable wheels 64 riding on the lower rail 62. Extending rearwardly from the carriage is a bracket 66 having fixed to its outer end a gear element 68 adapted to mesh with the threads of screw 14 in such manner that as the screw rotates, the carriage is moved back and forth parallel with mandrel 10.

The carriage carries a small platform 70 on which may be rested a glue pot. This arrangement is used as a matter of convenience as to ensure that the glue pot will always be within convenient reach of the operator. This feature will be more thoroughly understood by reference to the description of the operation of the apparatus which is set out hereinafter.

The tension applying device 58 consists of a pair of vertical guide plates 72 and 74 and a spring biased plate 76 which bears down on the top surface of the strip material 78. In this regard, it will be understood that there is a lower plate extending between the bottom edges of vertical guide plates 72 and 74 so that the strip is in effect squeezed between the spring biased plate 76 and the lower plate. As a preferred expedient, there is provided an adjustment device 80 for adjusting the downward pressure of plate 76. This device is not shown in detail in the drawing but its construction will be understod by persons familiar with this type of equipment.

Arranged at either end of the path of travel of the carriage, there are a pair of trip switches 82 and 84. These devices are included in the electrical circuit operating motor 32 for the purpose of interrupting power to the motor to stop rotation of screw 14 as the carriage reaches either end of its travel.

A pair of foot treadles, only one of which can be seen in the drawing, viz. treadle 86, are arranged for convenient reach of the operator and it is these treadles which are used to restart the motor 32.

The carriage carries a cam device 88, the function of which is to trip a switch 90 connected to a solenoid knife device 92. This latter device is of a type known per se and essentially consists of a vertically reciprocable knife blade 94 whose lower end is connected to a solenoid core so that as the solenoid coil is activated upon closure of switch 90, the blade is raised upwardly against the fabric which has just been wound on the coater core 42. It will be noted that the cam device 88 is designed to trip switch 90 for a predetermined period of time as the carriage is reaching it sright-hand end of travel. This period of time is determined by the rate of rotation of the mandrel so that at least one rotation of the mandrel is made while the blade 94 is pressed upwardly against the fabric as to cut the fabric completely free. In order to ensure that the knife blade 94 is not raised when the carriage is moving to the left, the circuit including switch 90 and the solenoid knife 92 is kept open during the leftward travel of the carriage. This can be effected, for example, by utilizing the left-hand limit switch 82 to render this particular circuit operable upon closure of trip switch 90 and using the right-hand limit switch 84 to render this circuit open despite closure of trip switch 90.

As previously stated, it is the chief object of the apparatus of this invention to accommodate variations in width of the fabric strip 78. In accord with the illustrated embodiment of the invention, this object is achieved by utilizing a variable speed gear box 100 between the output of the motor and the feed screw 14. In this regard, it will be appreciated that while variations in the width of the strip material can occur in any one roll 56 of strip material, it more frequently happens that there will be variations as between different rolls. Thus, in the normal course it is not necessary for the operator to change the speed of rotation of the feed screw for any single roll. It is common that a change of speed will have to be effected when changing from one roll to another. For example, should a second roll have a strip which is one-sixteenth of an inch less in width than a strip of a previous roll, the operator will find that gaps occur in the fabric as wound on core 42. The operator can thus accommodate this variation in the width of a strip by slowing down the speed of rotation of screw 14. Similarly, should the strip of a second roll have a width which slightly exceeds the width of a previous roll, the fabric will be slightly overlapped as it is wound on the second core. To accommodate this increase in width of the fabric, the operator will slightly increase the speed of rotation of feed screw 14. As a matter of convenience, the operation of the variable speed gear 100 is remotely controlled by a switch 102 arranged within convenient reach of the operator.

In the foregoing description of the drive between motor 32 and feed screw 14, it will be understood that the mandrel 10 is always rotated at the same speed and that it is only the speed of rotation of the feed screw which is varied. However, it will also be appreciated that as the object of the invention is accomplished by changing the relative speed of rotation between the mandrel 10 and feed screw 14, it would be possible to rotate feed screw 14 at a constant rate while providing means for varying the speed of rotation of the mandrel 10. Similarly, of course, it would be within the scope of the invention to provide means for varying the speed of both screw 14 and mandrel 10.

Operation of the illustrated apparatus is as follows. In describing the operation, it is assumed that a complete cycle commences at the stage at which a wrapped core 42 has just been removed from the apparatus. At this point, the holder 36 has been dropped to its lower position and the wound core removed from the mandrel. The operator slides a new core on the mandrel taking particular care to see that the core is rammed tightly against the last collar 44 to make sure that the small knife edge carried thereby engages the inside surface of the core. The holder 36 is then raised as to engage the free end of the mandrel. Here it should be understood that at this stage of the operation, the fabric feeding device 12 is located at the right-hand end of the feed screw as it has travelled to this end in winding the farbic on the previous core. Following sliding of the new core on the mandrel and engagement of the free end of the mandrel by the holder 36, the operator presses the first foot pedal 86 at the right-hand end of the machine which operates motor 32 as to move device 12 to the left. As device 12 begins to move, the operator lifts the adhesive applicator from the platform 70 and moves along the length of the rotating core while pressing the adhesive applicator against the core as to fully coat the outside surface of the core with the adhesive. The leftward movement of the device 12 stops automatically as limted switch 82 is contacted. The operator then places the adhesive applicator on platform 70 and grasps the free end of fabric strip 78 and fixes it to the core, preferably by means of a staple. The second foot pedal (not shown) is then depressed and device 12 moves to the right with the fabric strip being automatically wound on the core. As device 12 reaches the switch 90, the fabric will have been fully wound on the core and following actuation of switch 90, the solenoid knife 92 cuts the fabric and the operator fixes the end of the fabric to the core by a staple as a precautionary step to ensure that the fabric is tightly held on the core until the adhesive cures. Holder 36 is then lowered and the newly wound core removed from the mandrel and a full cycle has been completed.

Should the operator observe that, as the strip is being wound upon the core, overlapping or gaps in the winding are occurring, he can vary the speed of rotation of the feed screw as required. As previously mentioned, these gaps or overlapping are more likely to occur when changing from one roll of strip to a new roll rather than during the winding of any one roll. It will also be appreciated that as the apparatus is adapted to winding cores of different diameters (by adopting larger or smaller collars 44), it will be essential to change the relative speed between the feed screw and the mandrel to accommodate the new size core.

What I claim as my invention is:

1. An apparatus for winding strip fabric on a paint roller core comprising in combination a frame, a rotatable mandrel mounted on said frame and adapted to receive and to rotate a long length of core material, a rotatable feed screw mounted on said frame with its longitudinal axis extending substantially parallel to the longitudinal axis of said mandrel, a strip fabric feeding device supported by said frame adjacent said feed screw and adapted to move back an forth in a direction substantially parallel with the longitudinal axis of said feed screw and said mandrel, gear means operatively interconnecting said fabric feeding device and said feed screw whereby the rotation of said feed screw causes the movement of said feeding device, means for rotating said feed screw and said mandrel, said rotating means consisting of a motor, gear reducer means operatively connected between the output shaft of said motor and said mandrel, a variable speed gear operatively connected between the output shaft of said motor and said feed screw, and manual switch means for controlling said variable speed gear, said switch means being poistioned adjacent said mandrel whereby an operator may change the relative speed of said mandrel and said feed screw while stationed close to said mandrel and in a position to observe gaps and overlaps in the winding of said strip fabric on a length of core material on said mandrel.

2. An apparatus as claimed in claim 1 including a solenoid knife fixed to said frame adjacent the end of the mandrel at which the winding is terminated and having a knife blade adapted to bear against and to cut through fabric wound on said core, a cam switch fixed to said frame adjacent the path of movement of said strip feeding device and electrically interconnected with said solenoid knife so that its actuations causes said knife to move against the fabric wound on said core, cam means carried by said strip feeding device and positioned to trip said cam switch when said strip feeding device moves past said cam switch at the end of each winding operation, said cam means being dimensioned to actuate said cam switch and said knife blade during one full rotation of said mandrel whereby said fabric is cut about the full circumference of said mandrel.

References Cited

UNITED STATES PATENTS

| | | | |
|---|---|---|---|
| 3,202,560 | 8/1965 | Michael | 156—425 XR |
| 2,776,698 | 1/1957 | Kreger | 156—429 |
| 2,812,007 | 11/1957 | Touchett et al. | 156—429 XR |

PHILIP DIER, *Primary Examiner.*